US012631989B2

(12) United States Patent
Toyota et al.

(10) Patent No.: US 12,631,989 B2
(45) Date of Patent: May 19, 2026

(54) DEVELOPING DEVICE AND IMAGE FORMING APPARATUS

(71) Applicant: KYOCERA Document Solutions Inc., Osaka (JP)

(72) Inventors: Yuji Toyota, Osaka (JP); Junichi Nakagawa, Osaka (JP); Takeru Nagamoto, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 19/009,401

(22) Filed: Jan. 3, 2025

(65) Prior Publication Data

US 2025/0231507 A1 Jul. 17, 2025

(30) Foreign Application Priority Data

Jan. 12, 2024 (JP) ................................ 2024-003551

(51) Int. Cl.
*G03G 15/08* (2006.01)

(52) U.S. Cl.
CPC ..... *G03G 15/0893* (2013.01); *G03G 15/0865* (2013.01); *G03G 15/0877* (2013.01); *G03G 2215/0607* (2013.01); *G03G 2215/0822* (2013.01); *G03G 2215/083* (2013.01); *G03G 2215/0833* (2013.01); *G03G 2215/0838* (2013.01)

(58) Field of Classification Search
CPC ........... G03G 15/0865; G03G 15/0891; G03G 15/0893; G03G 15/0877; G03G 15/0887; G03G 15/0889; G03G 2215/0822; G03G 2215/0827; G03G 2215/083; G03G 2215/0833; G03G 2215/0838
See application file for complete search history.

(56) References Cited

U.S. PATENT DOCUMENTS

| | | | | |
|---|---|---|---|---|
| 11,209,752 | B2 * | 12/2021 | Sasaki | G03G 15/095 |
| 2008/0260430 | A1 | 10/2008 | Sakamoto et al. | 399/254 |
| 2011/0020037 | A1 | 1/2011 | Sakamoto et al. | 399/254 |
| 2016/0266517 | A1 * | 9/2016 | Suenami | G03G 15/0844 |
| 2018/0335725 | A1 | 11/2018 | Ariizumi et al. | G03G 15/0891 |

(Continued)

FOREIGN PATENT DOCUMENTS

| | | |
|---|---|---|
| JP | H 11-219013 A | 8/1999 |
| JP | 2018-194784 A | 12/2018 |

*Primary Examiner* — Carla J Therrien
(74) *Attorney, Agent, or Firm* — Stein IP, LLC

(57) ABSTRACT

A developing device includes a development container, a first conveyance member, a second conveyance member, and a developer carrier. The second conveyance member includes a regulation blade that is formed downstream of a second conveyance blade with respect to a second direction which is a conveyance direction of the developer, and that conveys the developer in a direction opposite to the second conveyance blade. A developer replenishment port is formed in an upper surface of the development container, and at least part of an opening length thereof in the second direction is included in a regulation area which is an area inside a second conveyance chamber where the regulation blade is disposed. At least part of the developer replenished through the developer replenishment port falls into both a first conveyance chamber and the regulation area.

5 Claims, 6 Drawing Sheets

(56) References Cited

U.S. PATENT DOCUMENTS

| | | | | |
|---|---|---|---|---|
| 2019/0391511 | A1 | 12/2019 | Ariizumi et al. .. | G03G 15/0891 |
| 2021/0364944 | A1 | 11/2021 | Fujishima et al. ..... | G03G 15/08 |
| 2021/0364951 | A1* | 11/2021 | Sasaki ................ | G03G 15/0891 |

* cited by examiner

DEVELOPING DEVICE AND IMAGE FORMING APPARATUS

INCORPORATION BY REFERENCE

This application is based on and claims the benefit of priority from Japanese Patent Application No. 2024-003551 filed on Jan. 12, 2024, the contents of which are hereby incorporated by reference.

BACKGROUND

The present disclosure relates to a developing device and an image forming apparatus.

In an electrophotographic image forming apparatus, such as a copier and a printer, a developing device is widely used which develops an electrostatic latent image formed on the outer circumferential surface of an image carrier, such as a photosensitive drum, by supplying toner to it, thereby forming a toner image that is later transferred onto a sheet. Such a developing device employs a developing method that uses, for example, a two-component developer including a carrier and a toner, provided with a developing roller (a developer carrier) that supplies the developer to the image carrier by conveying, while stirring, the developer inside a development container where the developer is contained.

In a developing device employing a two-component development method, while the toner is consumed in development operations, the magnetic carrier remains in the development container, without being consumed. Thus, the magnetic carrier deteriorates more due to mechanical stress as the frequency with which it is stirred with the toner inside the development container increases. This deterioration degrades the magnetic carrier's charging performance with respect to the toner. To address this problem, there has been proposed a developing device in which the degradation of charging performance is suppressed by replenishing a development container with a fresh developer including a magnetic carrier and a toner while discharging an excess of the developer from the development container.

SUMMARY

According to one aspect of the present disclosure, a developing device includes a development container, a first conveyance member, a second conveyance member, and a developer carrier. The development container includes a first conveyance chamber and a second conveyance chamber that are arranged parallel to each other, a first partition wall that separates the first conveyance chamber and the second conveyance chamber along a longitudinal direction of the first conveyance chamber and the second conveyance chamber, a communication portion that allows the first conveyance chamber and the second conveyance chamber to communicate with each other at opposite end-part sides of the first partition in a longitudinal direction thereof, a developer replenishment port through which a developer including a magnetic carrier and a toner is replenished, and a developer discharge port that is disposed at a downstream end part of the second conveyance chamber and through which an excess of the developer is discharged. The development container contains the developer. The first conveyance member includes a first rotation shaft, and a first conveyance blade formed on an outer circumferential surface of the first rotation shaft, and conveys, while stirring, the developer in the first conveyance chamber in a first direction. The second conveyance member includes a second rotation shaft, and a second conveyance blade formed on an outer circumferential surface of the second rotation shaft, and conveys, while stirring, the developer in the second conveyance chamber in a second direction that is opposite to the first direction. The developer carrier is rotatably supported in the development container so as to face an image carrier, and supplies the toner in the second conveyance chamber to the image carrier. The second conveyance member includes a regulation blade and a discharge blade. The regulation blade is formed downstream of the second conveyance blade with respect to the second direction, and conveys the developer in a direction opposite to the second conveyance blade. The discharge blade is formed downstream of the regulation blade with respect to the second direction, and conveys the developer in a same direction as the second conveyance blade to discharge the developer through the developer discharge port. The developer replenishment port is an opening formed in an upper surface of the development container, and at least part of an opening length thereof in the second direction is included in a regulation area which is an area inside the second conveyance chamber where the regulation blade is disposed. At least part of the developer replenished through the developer replenishment port falls into both the first conveyance chamber and the regulation area.

DETAILED DESCRIPTION

Hereinafter, an embodiment of the present disclosure will be described with reference to the accompanying drawings. It should be understood that the present disclosure is not limited to the following descriptions.

Figure 1:
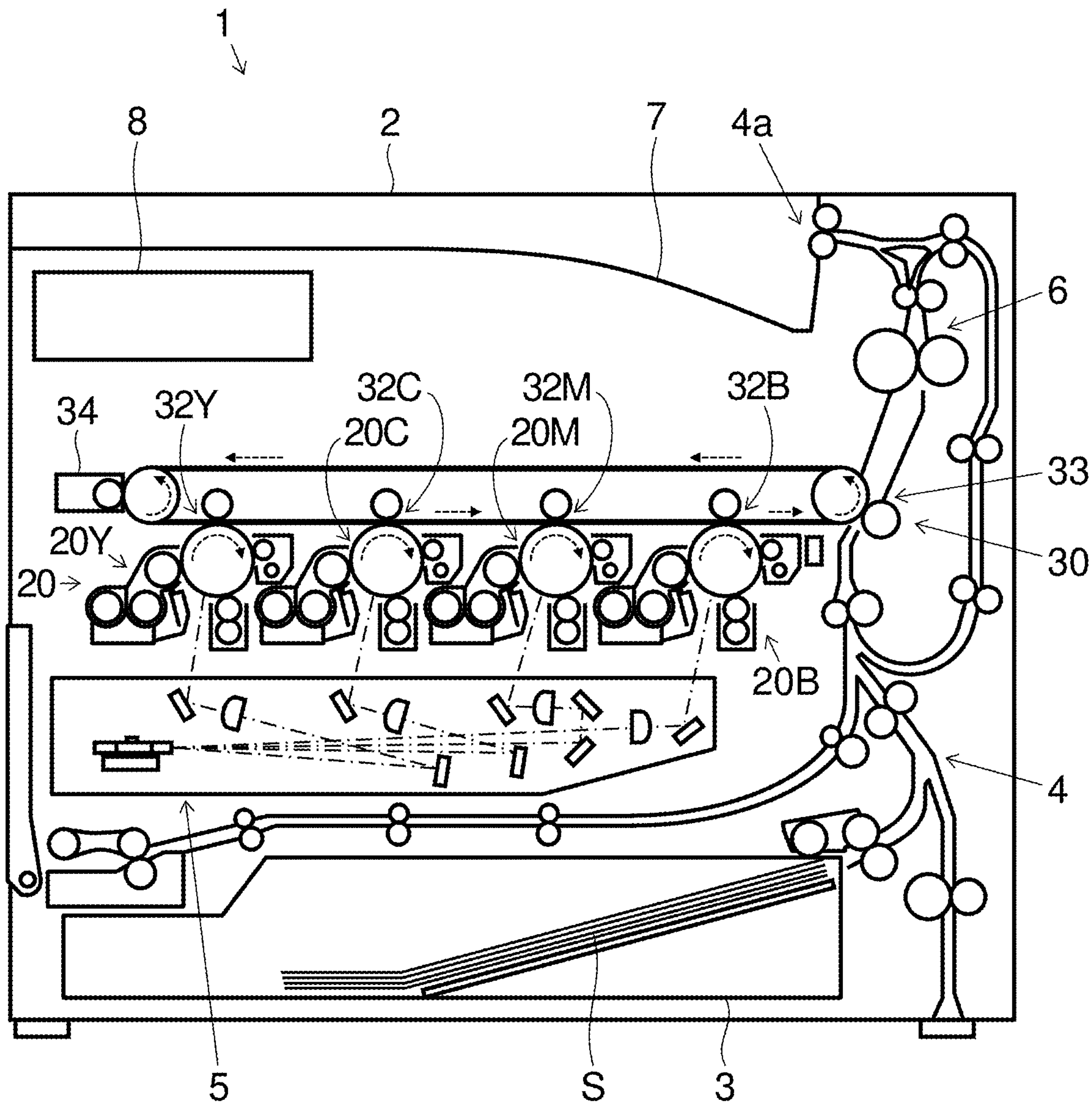
FIG. 1 is a schematic sectional front view of an image forming apparatus according to one embodiment of the present disclosure.
Figure 2:
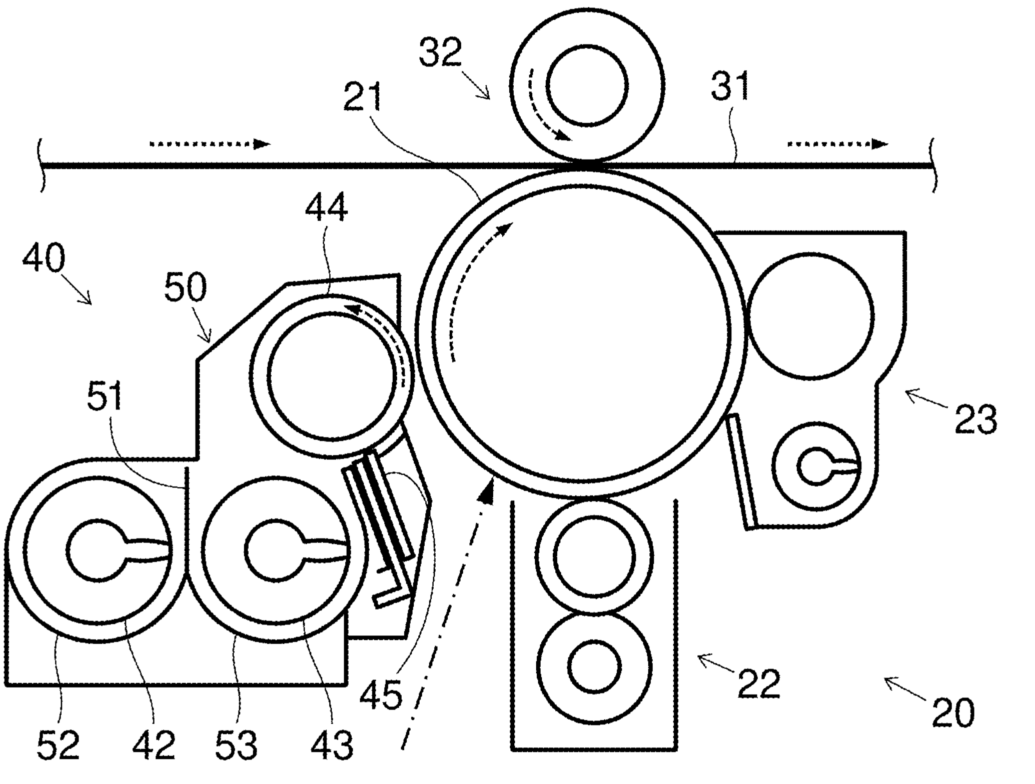
FIG. 2 is a schematic sectional front view of and around an image forming portion of the image forming apparatus shown in FIG. 1.

FIG. 1 is a schematic sectional front view of an image forming apparatus 1 according to the embodiment. FIG. 2 is a schematic sectional front view of and around an image forming portion 20 of the image forming apparatus 1 of FIG. 1. The image forming apparatus 1 of the present embodiment is, for example, a tandem-type color printer that uses an intermediate transfer belt 31 to transfer a toner image onto a sheet S. The image forming apparatus 1 may be what is called a multifunction peripheral, for example, having functions including printing, scanning (image reading), facsimile transmission, etc.

As shown in FIGS. 1 and 2, the image forming apparatus 1 includes, arranged in a main body 2 thereof, a sheet feed portion 3, a sheet conveyance portion 4, an exposure portion 5, the image forming portion 20, a transfer portion 30, a fixing portion 6, a sheet discharge portion 7, and a control portion 8.

The sheet feed portion 3 is disposed in a bottom part of the main body 2. The sheet feed portion 3 accommodates a plurality of sheets S for printing, and sends out the sheets S separately one by one during printing. The sheet conveyance portion 4 extends in an up-down direction along a side wall of the main body 2. The sheet conveyance portion 4 conveys a sheet S sent out from the sheet feed portion 3 to a secondary transfer portion 33 and the fixing portion 6, and further discharges the sheet S, after fixing, through a sheet discharge port 4*a* into the sheet discharge portion 7. The exposure portion 5 is disposed above the sheet feed portion 3. The exposure portion 5 irradiates the image forming portion 20 with laser light controlled based on image data.

The image forming portion 20 is disposed above the exposure portion 5 but below the intermediate transfer belt 31. The image forming portion 20 includes an image forming portion 20Y for yellow, an image forming portion 20C for cyan, an image forming portion 20M for magenta, and an image forming portion 20B for black. These four image forming portions 20 are identical in basic configuration. Thus, in the following description, unless specific distinction is necessary, identification symbols "Y," "C," "M," and "B" that respectively represent the four different colors may be omitted.

The image forming portions 20 each include a photosensitive drum (image carrier) 21 that is supported so as to be rotatable in a predetermined direction (clockwise in FIGS. 1 and 2). The image forming portions 20 each further include, around the photosensitive drum 21, a charging portion 22, a developing device 40, and a drum cleaning portion 23, which are arranged along a rotation direction of the photosensitive drum 21. Note that, between the developing device 40 and the drum cleaning portion 23, a primary transfer portion 32 is disposed.

The photosensitive drum 21, which is formed in a cylindrical shape extending in a horizontal direction, has a photosensitive layer of an amorphous silicon photosensitive member, for example, formed on its outer circumferential surface. The charging portion 22 charges a surface (the outer circumferential surface) of the photosensitive drum 21 to a predetermined potential. The exposure portion 5 exposes the outer circumferential surface of the photosensitive drum 21 with light after the outer circumferential surface is charged by the charging portion 22, and thereby, an electrostatic latent image of an original image is formed on the outer circumferential surface of the photosensitive drum 21. The developing device 40 supplies toner onto the electrostatic latent image to develop it, and thereby a toner image is formed. The four image forming portions 20 each form a toner image in a corresponding one of the different colors. After the toner is primarily transferred onto an outer circumferential surface of the intermediate transfer belt 31, the drum cleaning portion 23 performs cleaning by removing residual toner and the like remaining on the outer circumferential surface of the photosensitive drum 21. In this manner, the image forming portions 20 form images (toner images), which are to be transferred onto a sheet S later.

The transfer portion 30 includes the intermediate transfer belt 31, primary transfer portions 32Y, 32C, 32M, and 32B, the secondary transfer portion 33, and a belt cleaning portion 34. The intermediate transfer belt 31 is disposed above the four image forming portions 20. The intermediate transfer belt 31 is an endless intermediate transfer member that is supported to be rotatable in a predetermined direction (counterclockwise in FIG. 1), and onto which the toner images formed respectively in the four image forming portions 20 are primarily transferred sequentially to be superimposed on one another. The four image forming portions 20 are arranged in what is called a tandem manner so as to be arrayed in line from an upstream side toward a downstream side in a rotation direction of the intermediate transfer belt 31.

The primary transfer portions 32Y, 32C, 32M, and 32B are each disposed above one of the image forming portion 20Y, 20C, 20M, and 20B corresponding to their respective colors, with the intermediate transfer belt 31 interposed therebetween. The secondary transfer portion 33 is disposed upstream of the fixing portion 6 with respect to a sheet conveyance direction of the sheet conveyance portion 4 but downstream of the four image forming portions 20Y, 20C, 20M, and 20B with respect to the rotation direction of the intermediate transfer belt 31. The belt cleaning portion 34 is disposed downstream of the secondary transfer portion 33 with respect to the rotation direction of the intermediate transfer belt 31.

The primary transfer portion 32 transfers the toner image formed on the outer circumferential surface of the photosensitive drum 21 onto the intermediate transfer belt 31. In other words, the toner images are primarily transferred onto the outer circumferential surface of the intermediate transfer belt 31 in the primary transfer portions 32Y, 32C, 32M, and 32B corresponding to the four different colors. Along with rotation of the intermediate transfer belt 31, at predetermined timings, the toner images of the four image forming portions 20 are transferred successively onto the intermediate transfer belt 31 to be superimposed on one another, and thereby, on the outer circumferential surface of the intermediate transfer belt 31, a color toner image is formed in which toner images of the four colors, namely, yellow, cyan, magenta, and black, are superimposed on one another.

The color toner image on the outer circumferential surface of the intermediate transfer belt 31 is transferred onto a sheet S, having been synchronously conveyed by the sheet conveyance portion 4, at a secondary transfer nip portion formed in the secondary transfer portion 33. The belt cleaning portion 34 performs cleaning, after the secondary transfer, by removing deposits such as residual toner and the like from the outer circumferential surface of the intermediate transfer belt 31. In this manner, the transfer portion 30 transfers (records) the toner image formed on the outer circumferential surface of the photosensitive drum 21 onto the sheet S.

The fixing portion 6 is disposed above the secondary transfer portion 33. The fixing portion 6 applies heat and pressure to the sheet S having the toner image transferred thereon, and thereby fixes the toner image on the sheet S.

The sheet discharge portion 7 is disposed above the transfer portion 30. The sheet S having the toner image fixed thereon and having undergone printing is conveyed to the sheet discharge portion 7. From the sheet discharge portion 7, a printed sheet (printed matter) is allowed to be taken out from above.

The control portion 8 includes a CPU, an image processor, a storage portion, and other electronic circuits and electronic components (of which none is illustrated). The CPU controls operations of various components provided in the image forming apparatus 1 on the basis of a control program and control data stored in the storage portion, and thereby performs processing related to the functions of the image forming apparatus 1. The sheet feed portion 3, the sheet conveyance portion 4, the exposure portion 5, the image forming portion 20, the transfer portion 30, and the fixing portion 6 each individually receive a command from the control portion 8, and cooperate with each other to perform printing with respect to a sheet S. The storage portion is composed of, for example, a combination of nonvolatile storage devices such as a program ROM (read only memory), a data ROM, etc., and a volatile storage device such as a RAM (random access memory).

Figure 3:
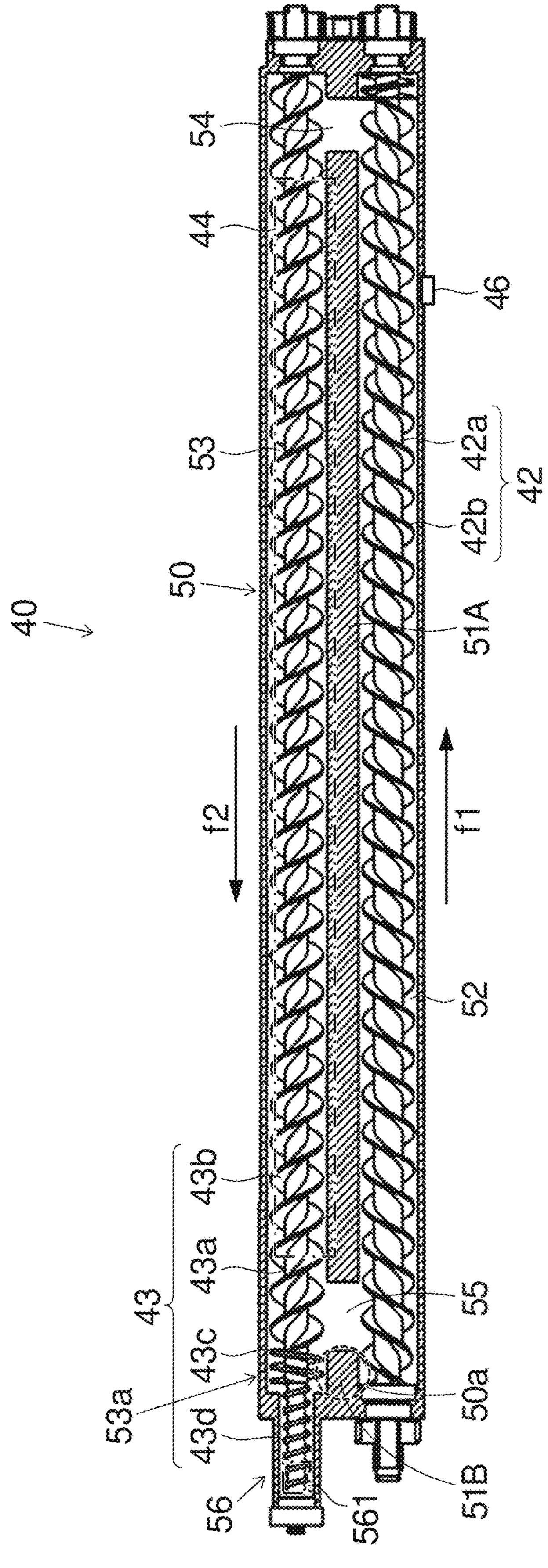
FIG. 3 is a horizontal sectional plan view of a developing device of the image forming portion shown in FIG. 2.

Described next is a configuration of the developing device 40, with reference to FIG. 3 in addition to FIG. 2. FIG. 3 is a horizontal sectional plan view of the developing device 40 of the image forming portion 20 of FIG. 2. Note that the developing devices 40 each corresponding to one of the four different colors are identical to each other in basic configuration, and thus the identification symbols representing respective colors of the components and overlapping descriptions thereof will be omitted. In addition, in this description, an "axis direction" refers to a rotational axis direction of each of the photosensitive drum 21, a first conveyance member 42, a second conveyance member 43, and a developing roller 44, of which all extend parallel to each other (in a depth direction of the sheet on which FIG. 2 is drawn, a right-left lateral direction in FIG. 3).

The developing device 40 supplies the toner to the outer circumferential surface of the photosensitive drum 21. The developing device 40 is attachable and detachable with respect to the main body 2 of the image forming apparatus 1. The developing device 40 includes a development container 50, the first conveyance member 42, the second conveyance member 43, the developing roller (developer carrier) 44, a regulation member 45, and a toner concentration sensor 46.

The development container 50 has an elongated shape extending along an axis direction of the photosensitive drum 21, and is disposed with a longitudinal direction thereof aligned horizontally. That is, the longitudinal direction of the development container 50 is parallel to the axis direction of the photosensitive drum 21. The development container 50 accommodates, as a developer that includes a toner to be supplied to the photosensitive drum 21, a two-component developer that includes a toner and a magnetic carrier. In the development container 50, a developer replenishment port 50*a* is opened in upper surfaces of first and second conveyance chambers 52 and 53, which will be described later, such that the development container 50 is replenished with the developer via the developer replenishment port 50*a*.

The development container 50 includes a first partition wall 51A, the first conveyance chamber 52, the second conveyance chamber 53, a first communication portion 54, and a second communication portion 55.

The first partition wall 51A is provided in a lower part inside the development container 50. The first partition wall 51A is disposed substantially at a central part in a direction (a right-left lateral direction in FIG. 2, an up-down direction in FIG. 3) that intersects with the longitudinal direction of the development container 50. The first partition wall 51A is substantially formed in a plate shape extending in the longitudinal direction and an up-down direction of the development container 50. The first partition wall 51A partitions an inside of the development container 50 in a direction intersecting with the longitudinal direction of the development container 50. In other words, the first partition wall 51A separates the first conveyance chamber 52 and the second conveyance chamber 53 along the longitudinal direction.

The first conveyance chamber 52 and the second conveyance chamber 53 are provided inside the development container 50. The first conveyance chamber 52 and the second conveyance chamber 53 are formed by the first partition wall 51A partitioning the inside of the development container 50. The first conveyance chamber 52 and the second conveyance chamber 53 are arranged parallel to each other at approximately the same height.

The second conveyance chamber 53 includes an area around a disposition area of the developing roller 44 inside the development container 50, and is disposed adjacent to the photosensitive drum 21. The first conveyance chamber 52 is disposed in an area, inside the development container 50, that is more separated from the photosensitive drum 21 than the second conveyance chamber 53 is. In the first conveyance chamber 52, the developer is conveyed by the first conveyance member 42 in a first direction f1. In the second conveyance chamber 53, the developer is conveyed by the second conveyance member 43 in a second direction f2 that is opposite to the first direction f1.

The first communication portion 54 and the second communication portion 55 are respectively disposed outside opposite end parts of the first partition wall 51A in the longitudinal direction thereof. The first communication portion 54 and the second communication portion 55 allow the first conveyance chamber 52 and the second conveyance chamber 53 to communicate with each other in a direction (the right-left lateral direction in FIG. 2, the up-down direction in FIG. 3) that intersects with the longitudinal direction of the first partition wall 51A, that is, in a thickness direction of the first partition wall 51A, which is substantially plate-shaped. In other words, the first communication portion 54 and the second communication portion 55 allow the first conveyance chamber 52 and the second conveyance chamber 53 to communicate with each other at opposite end-part sides of the first partition wall 51A in the longitudinal direction thereof.

The first communication portion 54 allows communication between a downstream end of the first conveyance chamber 52 in the first direction f1 and an upstream end of the second conveyance chamber 53 in the second direction f2. Through the first communication portion 54, the developer is conveyed from the first conveyance chamber 52 toward the second conveyance chamber 53. In other words, the first communication portion 54 delivers the developer from the first conveyance chamber 52 to the second conveyance chamber 53 at the downstream side in the first direction f1.

The second communication portion 55 allows communication between a downstream end of the second conveyance chamber 53 in the second direction f2 and an upstream end of the first conveyance chamber 52 in the first direction f1. Through the second communication portion 55, the developer is conveyed from the second conveyance chamber 53 toward the first conveyance chamber 52. In other words, the second communication portion 55 delivers the developer from the second conveyance chamber 53 to the first conveyance chamber 52 at the downstream side in the second direction f2.

The first conveyance member 42 is disposed inside the first conveyance chamber 52. The second conveyance member 43 is disposed inside the second conveyance chamber

53. The first conveyance member 42 and the second conveyance member 43 are arranged parallel to each other at approximately the same height. The second conveyance member 43 extends close to and parallel to the developing roller 44. The first conveyance member 42 and the second conveyance member 43 are each supported in the development container 50 so as to be rotatable about an axis horizontally extending parallel to the developing roller 44.

The first conveyance member 42 and the second conveyance member 43 are identical to each other in basic configuration. The first conveyance member 42 includes a first conveyance blade 42*b* helically formed on an outer circumferential part of a first rotation shaft 42*a* that extends along the longitudinal direction of the development container 50. In the present embodiment, the first conveyance blade 42*b* of the first conveyance member 42 is double-threaded. The second conveyance member 43 includes a second conveyance blade 43*b* helically formed on an outer circumferential part of a second rotation shaft 43*a* that extends along the longitudinal direction of the development container 50. In the present embodiment, the second conveyance blade 43*b* of the second conveyance member 43 is double-threaded.

The first conveyance member 42, inside the first conveyance chamber 52, conveys the developer, while stirring the developer, in the first direction f1, which is a direction from the second communication portion 55 toward the first communication portion 54 along the rotational axis direction of the first conveyance member 42. The second conveyance member 43, inside the second conveyance chamber 53, conveys the developer, while stirring the developer, in the second direction f2, which is a direction from the first communication portion 54 toward the second communication portion 55 along the rotational axis direction of the second conveyance member 43. That is, the first conveyance member 42 and the second conveyance member 43 convey the developer, while stirring the developer, in mutually opposite directions in the longitudinal direction thereof, and thereby circulate the developer in a predetermined circulation direction.

The developing roller 44, which is located above the second conveyance member 43 inside the development container 50, is disposed to face the photosensitive drum 21. The developing roller 44 is supported in the development container 50 to be rotatable about an axis extending parallel to the axis of the photosensitive drum 21.

The developing roller 44 has part of an outer circumferential surface thereof exposed out of the development container 50 so as to face, and be close to, the photosensitive drum 21. The developing roller 44 carries, on the outer circumferential surface thereof, the toner to be supplied to the outer circumferential surface of the photosensitive drum 21 in a facing area with respect to the photosensitive drum 21. The developing roller 44 carries the toner inside the second conveyance chamber 53 of the development container 50, and supplies the toner to the photosensitive drum 21. In other words, the developing roller 44 causes the toner inside the second conveyance chamber 53 to adhere to an electrostatic latent image formed on the outer circumferential surface of the photosensitive drum 21, and thereby forms a toner image.

The regulation member 45 is disposed upstream of the facing area between the developing roller 44 and the photosensitive drum 21 in a rotation direction of the developing roller 44. The regulation member 45 is disposed close to, and facing, the developing roller 44 with a predetermined space between a leading edge thereof and the outer circumferential surface of the developing roller 44. The regulation member 45 extends along an entire length of the developing roller 44 in the axis direction of the developing roller 44. The regulation member 45 regulates a thickness of a layer of the developer carried on the outer circumferential surface of the developing roller 44 when the developer passes through the space between the leading edge of the regulation member 45 and the outer circumferential surface of the developing roller 44.

The toner concentration sensor 46 is disposed on a wall of the first conveyance chamber 52 along the longitudinal direction of the first conveyance chamber 52 (the first direction f1). For example, the toner concentration sensor 46 is located downstream of a central part of the first conveyance chamber 52 in the longitudinal direction thereof (the first direction f1) but upstream of the first communication portion 54. The toner concentration sensor 46 is disposed to face the first conveyance member 42. In the present embodiment, a headless sensor is used as the toner concentration sensor 46. The toner concentration sensor 46, which is a headless sensor, has a sensing surface thereof embedded in an inner wall surface of the first conveyance chamber 52. The toner concentration sensor 46 detects a concentration of the toner in the developer.

More specifically, the toner concentration sensor 46 is a sensor of a type that detects magnetic permeability, and acquires a toner concentration (a mixture ratio of the toner T to the magnetic carrier C in the developer; T/C) by detecting a change of the magnetic permeability of a two-component developer. The magnetic permeability changes with the ratio of the toner to the magnetic carrier in the developer inside the first conveyance chamber 52, and in response to such changes, the toner concentration sensor 46 outputs different signals. The control portion 8, on the basis of an output signal received from the toner concentration sensor 46, controls starting and stopping of the replenishment of the developer (the toner and the carrier) with respect to the developing device 40.

The developer inside the development container 50 is caused by rotations of the first conveyance member 42 and the second conveyance member 43 to circulate, via the first communication portion 54 and the second communication portion 55, between the first conveyance chamber 52 and the second conveyance chamber 53 in the predetermined circulation direction. At this time, the toner in the development container 50 is stirred to be charged, and is then carried on the outer circumferential surface of the developing roller 44. The developer carried on the outer circumferential surface of the developing roller 44 has a layer thickness thereof regulated by the regulation member 45, and is then conveyed, by the rotation of the developing roller 44, to the facing area between the developing roller 44 and the photosensitive drum 21. When a predetermined developing voltage is applied to the developing roller 44, due to a potential difference between the developing roller 44 and the surface (outer circumferential surface) of the photosensitive drum 21, the toner in the developer carried on the outer circumferential surface of the developing roller 44 moves, in the facing area, onto the outer circumferential surface of the photosensitive drum 21. In this manner, the electrostatic latent image on the outer circumferential surface of the photosensitive drum 21 is developed with the toner.

The development container 50 further includes a discharge portion 56. The discharge portion 56 is disposed downstream of the downstream end of the second conveyance chamber 53 in the second direction f2. The discharge portion 56 is connected to the second conveyance chamber 53. Insides of the discharge portion 56 and the second conveyance chamber 53 communicate with each other. The discharge portion 56 has a smaller inner diameter than the second conveyance chamber 53. The discharge portion 56 includes a developer discharge port 561.

Note that the second rotation shaft 43*a* of the second conveyance member 43 extends continuously into the discharge portion 56. One end of the second rotation shaft 43*a* in the axis direction is rotatably supported by the development container 50 at a downstream end of the discharge portion 56 with respect to the second direction f2 of the second conveyance chamber 53.

The developer discharge port 561 is disposed at the downstream end of the discharge portion 56 with respect to the second direction f2 of the second conveyance chamber 53. The developer discharge port 561 is opened below the second rotation shaft 43*a* of the second conveyance member 43, for example. The developer discharge port 561 allows an excess of the developer inside the development container 50 to be externally discharged therethrough.

The second conveyance member 43 further includes, in addition to the second conveyance blade 43*b*, a regulation blade 43*c* and a discharge blade 43*d*. These three blades are arranged, in a direction from the second conveyance chamber 53 toward the discharge portion 56, in order of the second conveyance blade 43*b*, the regulation blade 43*c*, and the discharge blade 43*d*. The regulation blade 43*c* and the discharge blade 43*d*, which are formed integral with the second rotation shaft 43*a* similarly to the second conveyance blade 43*b*, are each helically formed on the outer circumferential part of the second rotation shaft 43*a* along the axis direction thereof.

The regulation blade 43*c*, which is formed downstream of the second conveyance blade 43*b* with respect to the second direction f2 of the second conveyance chamber 53, is disposed inside the second conveyance chamber 53. The regulation blade 43*c* is disposed in a regulation area 53*a* located at a downstream end part of the second conveyance chamber 53 with respect to the second direction f2. The regulation blade 43*c* faces, in the second direction f2, a connection part of the second conveyance chamber and the discharge portion 56.

The regulation blade 43*c* is wound in a direction opposite to the second conveyance blade 43*b*. That is, the regulation blade 43*c* conveys the developer to a direction opposite to the second conveyance blade 43*b*. Thereby, the regulation blade 43*c* holds back the developer having been conveyed close to the downstream end inside the second conveyance chamber 53, and regulates movement of the developer toward the discharge portion 56. Note that the regulation blade 43*c* has a smaller pitch than the second conveyance blade 43*b*.

There is a predetermined space (clearance) between an outer circumferential part of the regulation blade 43*c* and an inner surface of the development container 50. When the amount of the developer in the second conveyance chamber 53 exceeds a predetermined amount, an excess of the developer is conveyed, through the space between the outer circumference part of the regulation blade 43*c* and the inner surface of the development container 50, toward the discharge portion 56.

The discharge blade 43*d*, which is formed downstream of the regulation blade 43*c* with respect to the second direction f2 of the second conveyance chamber 53, is disposed inside the discharge portion 56. The discharge blade 43*d* is wound in the same direction as the second conveyance blade 43*b*. That is, the conveyance direction of the developer inside the discharge portion 56 is the same as the second direction f2 of the second conveyance chamber 53. Thus, the discharge blade 43*d* conveys the excess of the developer inside the discharge portion 56 toward the developer discharge port 561, so that the excess of the developer is discharged through the developer discharge port 561. Note that the discharge blade 43*d* has a smaller outer diameter than the second conveyance blade 43*b* and the regulation blade 43*c*. The discharge blade 43*d* has a smaller pitch than the second conveyance blade 43*b*.

Figure 4:
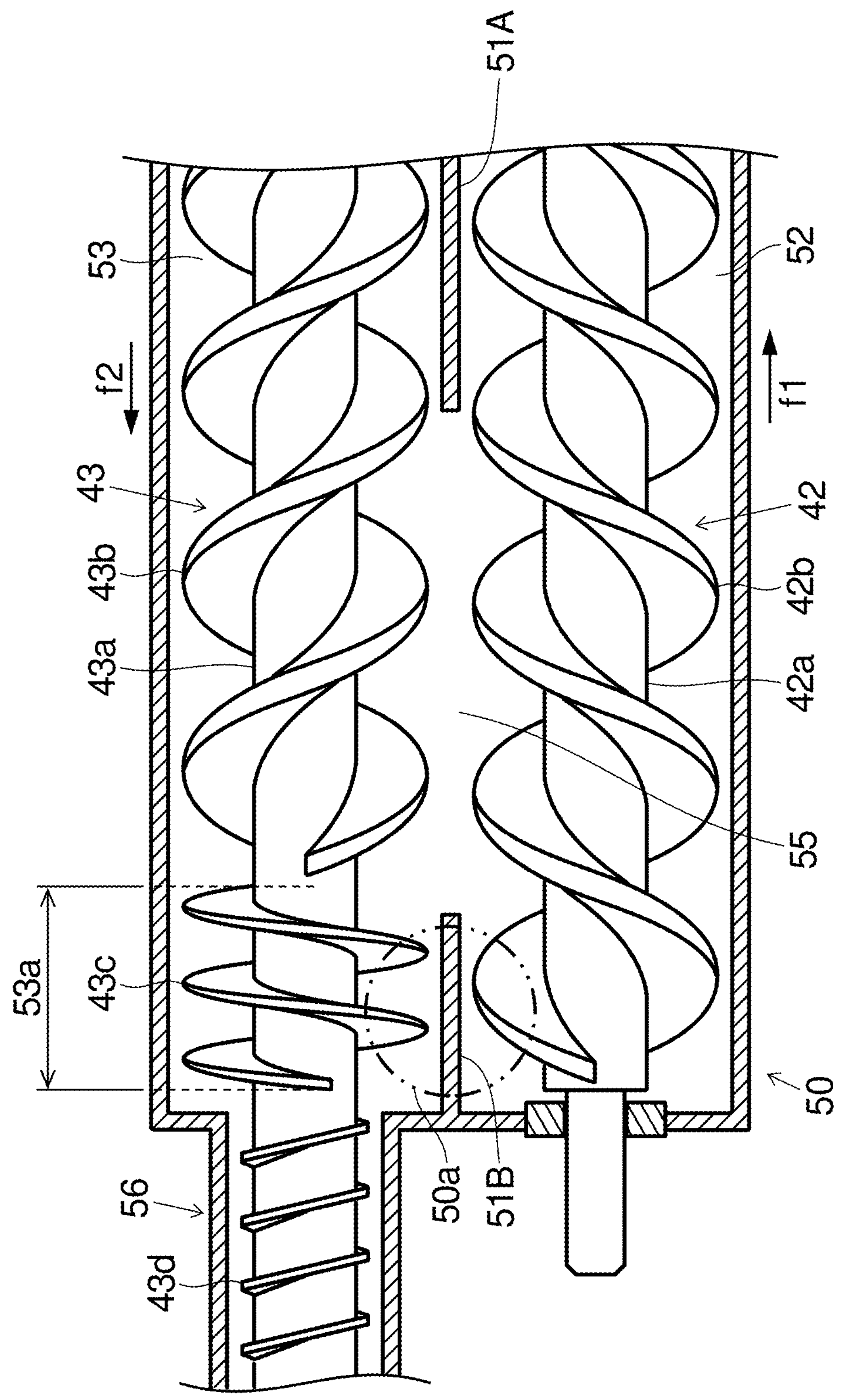
FIG. 4 is a partial enlarged view of and around a developer replenishment port of the developing device shown in FIG. 3.

FIG. 4 is a partial enlarged view of and around the developer replenishment port 50*a* of the developing device 40 of FIG. 3. The developer replenishment port 50*a* is depicted with a dashed-and-double-dotted line in FIG. 4 to show a position of the developer replenishment port 50*a* as seen from above.

The developer replenishment port 50*a* is an opening formed in the upper surfaces of the first conveyance chamber 52 and the second conveyance chamber 53 of the development container 50. In the developer replenishment port 50*a*, at least part of an opening length thereof in the second direction f2 is included in the regulation area 53*a*, which is an area in which the regulation blade 43*c* is disposed inside the second conveyance chamber 53. As seen from above, the developer replenishment port 50*a* is opened over both the first conveyance chamber 52 and the regulation area 53*a* of the second conveyance chamber 53. At least part of the developer replenished through the developer replenishment port 50*a* falls into both the first conveyance chamber 52 and the regulation area 53*a*.

According to the configuration described above, the developer replenished through the developer replenishment port 50*a* falls into both the first conveyance chamber 52 and the regulation area 53*a*, and thereby is put separately in the first conveyance chamber 52 and the second conveyance chamber 53 inside the development container 50. This helps improve developer dispersing performance without affecting developer conveyance speed. Thus, it becomes possible to suppress the occurrence of uneven toner concentration in the developer.

Note that it is preferable that the entire opening length of the developer replenishment port 50*a* in the second direction f2 be included in the regulation area 53*a*, which is an area in which the regulation blade 43*c* is disposed inside the second conveyance chamber 53. According to this configuration, in the regulation area 53*a*, the developer is fully stirred, which makes it possible to suppress discharge of fresh developer as it is from the discharge portion 56. This makes it possible to achieve improvement both in developer dispersing performance and in developer discharging performance.

The development container 50 further includes a second partition wall 51B. The second partition wall 51B is disposed downstream of the second communication portion 55 with respect to the second direction f2. Similarly to the first partition wall 51A, the second partition wall 51B is substantially formed in a plate shape that extends in the longitudinal direction (the second direction f2) and the up-down direction of the development container 50. The second partition wall 51B is disposed on a line extended from the first partition wall 51A in the longitudinal direction of the first partition wall 51A, so as to be adjacent to the regulation area 53*a* of the second conveyance chamber 53. The second partition wall 51B separates the first conveyance chamber 52 and the regulation area 53*a*.

The developer replenishment port 50*a* is disposed above the second partition wall 51B. As seen from above, the developer replenishment port 50*a* is opened in both the first conveyance chamber 52 and the regulation area 53*a* of the second conveyance chamber 53 across the second partition wall 51B. A falling area into which the developer replenished through the developer replenishment port 50*a* falls is partitioned by the second partition wall 51B into the first conveyance chamber 52 and the regulation area 53*a*.

According to the configuration described above, the developer that has fallen into the development container 50 through the developer replenishment port 50*a* hits an upper edge of the second partition wall 51B having a plate shape, and then falls into either one of the first conveyance chamber 52 and the regulation area 53*a*. In this manner, it is possible to make the developer replenished through the developer replenishment port 50*a* fall into both the first conveyance chamber 52 and the regulation area 53*a* in an appropriately divided manner.

Further, it is preferable that the opening length of the developer replenishment port 50*a* in the second direction f2 be entirely located downstream of the second communication portion 55 with respect to the second direction f2. According to this configuration, it is possible to prevent the developer replenished through the developer replenishment port 50*a* from falling into the second communication portion 55. That is, by enhancing the effect of allowing the developer to fall into both the first conveyance chamber 52 and the regulation area 53*a*, it becomes possible to effectively improve the developer dispersing performance.

Further, it is preferable that the opening length of the developer replenishment port 50*a* in the second direction f2 be shorter than the second partition wall 51B. According to this configuration, it is possible to prevent the developer replenished through the developer replenishment port 50*a* from falling into either the second communication portion 55 or the discharge portion 56. In this manner, it is possible to suppress discharge of fresh developer replenished through the developer replenishment port 50*a* as it is through the discharge portion 56 and the developer discharge port 561. Thus, it becomes possible to effectively improve the developer discharging performance.

Figure 5:
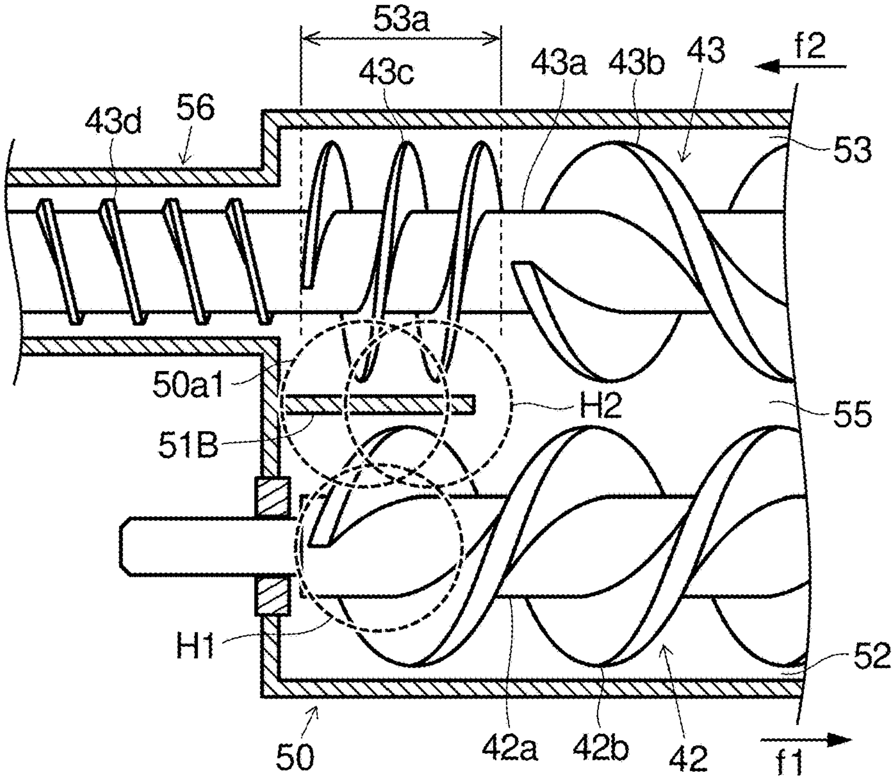
FIG. 5 is a first explanatory diagram showing a disposition example of the developer replenishment port of the developing device shown in FIG. 4.
Figure 6:
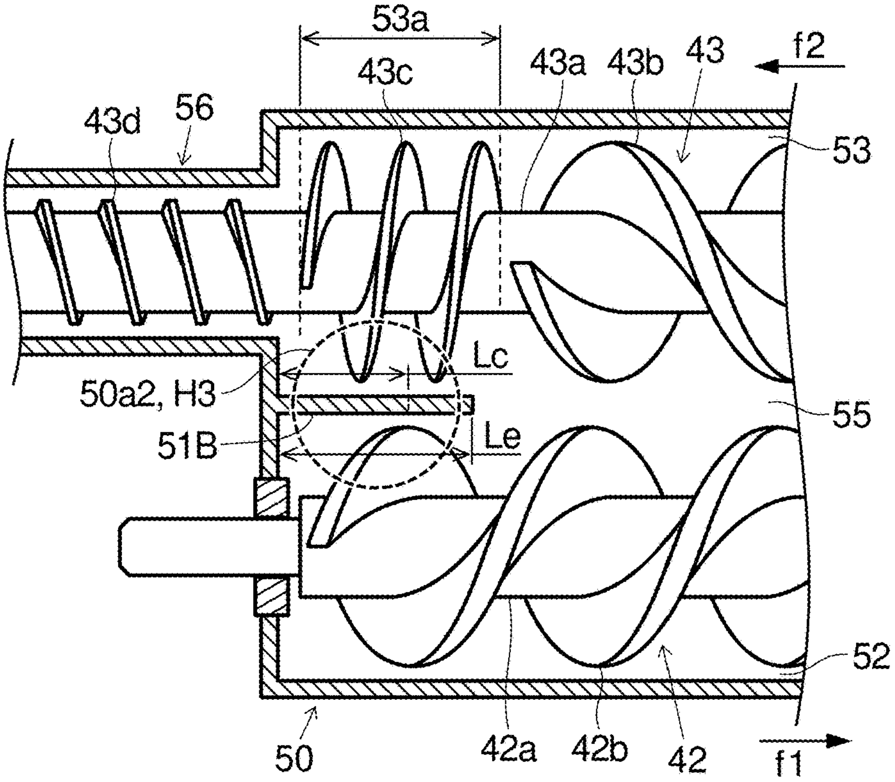
FIG. 6 is a second explanatory diagram showing a disposition example of the developer replenishment port of the developing device shown in FIG. 4.
Figure 7:
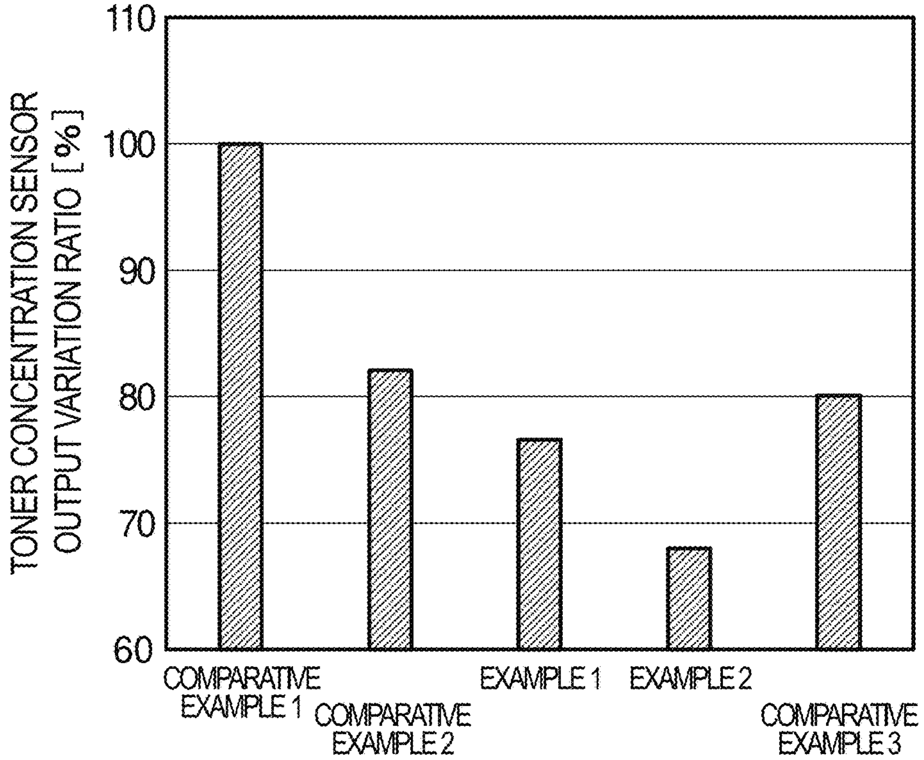
FIG. 7 is a graph showing output variation ratios of toner concentration sensors in developing devices of examples and comparative examples.
Figure 8:
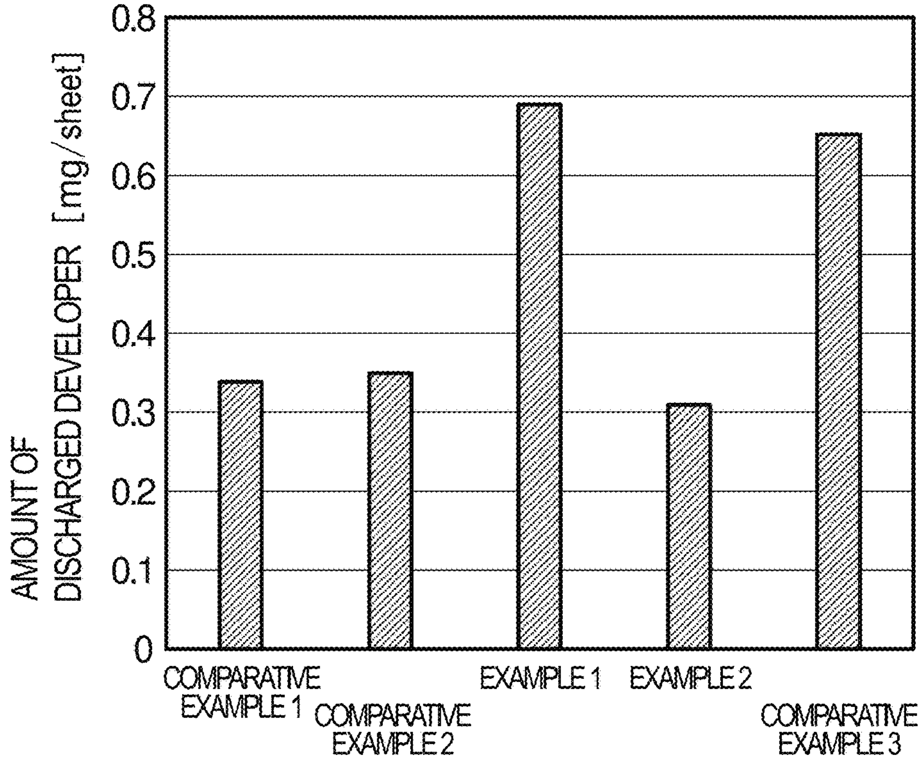
FIG. 8 is a graph showing amounts of discharged developer in the developing devices of the examples and the comparative examples.

Next, various examples will be described. FIGS. 5 and 6 are respectively first and second explanatory diagrams each illustrating a disposition example of the developer replenishment port 50*a* of the developing device 40 of FIG. 4. FIGS. 7 and 8 are graphs respectively showing output variation ratios of toner concentration sensors 46 and amounts of discharged developer in developing devices 40 of examples and comparative examples. Evaluated were effects of the disposition of the developer replenishment port 50*a* on the output variation of the toner concentration sensor (uneven toner concentration in the developer) and on the amount of discharged developer in each of the developing devices of the examples and the developing devices of the comparative example. Constituent conditions regarding the disposition of the developer replenishment port 50*a* are shown in Table 1, and FIGS. 5 and 6.

TABLE 1

| | Position of Developer Replenishment Port | | | | |
|---|---|---|---|---|---|
| | In Short-side Direction | In Longitudinal Direction (Second Direction f2) | 2nd Partition Wall Length | Developer Dispersing Performance | Developer Discharging Performance |
| Comparative Example 1 | Above 1st Conveyance Member | — | 15 mm | Unacceptable | Satisfactory |
| Comparative Example 2 | Above 2nd Partition Wall | Overlap with Regulation Area Upstream Part | | Acceptable | Satisfactory |
| Example 1 | | Overlap with Regulation Area Downstream Part | | Satisfactory | Acceptable |
| Example 2 | | Within Regulation Area | | Satisfactory | Satisfactory |
| Comparative Example 3 | | | 10 mm | Acceptable | Acceptable |

The "short-side direction" indicated in Table 1 in relation to the disposition of the developer replenishment port 50*a* refers to a direction orthogonal to the longitudinal direction of the development container 50 (the second direction f2, a right-left lateral direction in FIGS. 5 and 6), that is, an up-down direction in FIGS. 5 and 6. In the various examples, the developer replenishment port 50*a* is circular as seen from an up-down direction (depth directions of the sheets on which FIGS. 4, 5, and 6 are respectively drawn), with a diameter of 12 mm.

As shown in Table 1 and FIG. 5, in a developing device 40 of Comparative Example 1, a short-side direction position of a developer replenishment port H1 is above a first conveyance member 42. As shown in Table 1 and FIGS. 5 and 6, in developing devices 40 of Comparative Examples 2 and 3, short-side direction positions of developer replenishment ports H2 and H3 are each above a second partition wall 51B. In developing devices 40 of Examples 1 and 2, short-side direction positions of developer replenishment ports 50*al* and 50*a*2 are each above a second partition wall 51B.

In Comparative Example 2, a longitudinal direction position of the developer replenishment port H2 partly overlaps with an upstream part of a regulation area 53*a*. In Example 1, a longitudinal direction position of the developer replenishment port 50*al* partly overlaps with a downstream part of a regulation area 53*a*. In Example 2 and Comparative Example 3, longitudinal direction positions of the developer replenishment ports 50*a*2 and H3, respectively, are each within a regulation area 53*a*.

In each of Examples 1 and 2 and Comparative Examples 1 and 2, a length Le of the second partition wall 50B in the longitudinal direction is 15 mm as measured from a downstream-side inner surface of the development container 50 in the second direction f2. In Comparative Example 3, a length Lc of the second partition wall 51B in the longitudinal direction is 10 mm as measured from the downstream-side inner surface of the development container 50 in the second direction f2. Thus, in Comparative Example 3, part of the developer replenishment port H3 on an upstream side in the second direction f2 is located above the second communication portion 55.

For evaluations shown in FIGS. 7 and 8 and Table 1, comparisons were conducted in terms of output variation ratio of toner concentration sensors 46 and amount of developer discharged per sheet after printing was performed on 1000 sheets. Of output variations of toner concentration sensors 46, ratios were calculated with the variation in Comparative Example 1 as a reference (100%). A smaller output variation of a toner concentration sensor 46 indicates a more uniform dispersion of the toner in the developer.

In Comparative Example 1, the developer replenishment port H1 is located above the first conveyance member 42 and thus a fresh portion of the developer is prevented from being discharged as it is through the discharge portion 56, and thus Comparative Example 1 is evaluated as "satisfactory" in terms of developer discharging performance. However, in terms of developer dispersing performance, Comparative Example 1 is evaluated as "unacceptable" for its dependence on a screw shape of the first conveyance member 42.

In contrast, in Comparative Examples 2 and 3 and Examples 1 and 2, in which their developer replenishment ports are located above the respective second partition walls 51B, the developer dispersing performance is improved as shown in FIG. 7.

In Comparative Example 2, part of the developer replenishment port H2 in the longitudinal direction overlaps with an upstream part of the regulation area 53*a*, and another part is located closer to the second communication portion 55 than the regulation area 53*a*. As a result, part of the developer having fallen through the developer replenishment port H2 is not stirred by the regulation blade 43*c* in the regulation area 53*a*. In Comparative Example 2, the developer dispersing performance is improved as compared to Comparative Example 1, but the improvement is not sufficient, and thus Comparative Example 2 is evaluated as "acceptable" in terms of developer dispersing performance. Comparative Example 2 is evaluated as "satisfactory" in terms of developer discharging performance.

In Comparative Example 3, the length Lc of the second partition wall 51B in the longitudinal direction is shorter than a diameter of the developer replenishment port H3, and thus the developer in the regulation area 53*a* is piled up by the second partition wall 51B to an insufficient height. As a result, the developer in the regulation area 53*a* is not stirred sufficiently, and thus Comparative Example 3 is evaluated as "acceptable" both in developer dispersing performance and in developer discharging performance.

In Example 1, one part of the developer replenishment port 50*al* in the longitudinal direction overlaps with the downstream part of the regulation area 53*a*, and the other part thereof is located closer to the discharge portion 56 than the regulation area 53*a*. As a result, part of the developer having fallen through the developer replenishment port 50*al* becomes more likely to be discharged as it is from the discharge portion 56, and thus Example 1 is evaluated as "acceptable" in terms of developer discharging performance. In terms of developer dispersing performance, Example 1 is improved as compared to Comparative Examples 1 and 2, and thus is evaluated as "satisfactory".

In Example 2, the developer replenishment port 50*a*2 is located within the regulation area 53*a* in the longitudinal direction, and the length Le of the second partition wall 51B in the longitudinal direction is longer than a diameter of the developer replenishment port 50*a*2. By the second partition wall 51B causing the developer to be piled up to a sufficient height in the regulation area 52*a*, it becomes possible to stir the developer sufficiently in the regulation area 53*a*, and thus to suppress discharge of a fresh portion of the developer as it is through the discharge portion 56. Thus, Example 2 is evaluated as "satisfactory" in terms of both developer dispersing performance and developer discharging performance.

The above-described embodiment is by no means meant to limit the scope of the present disclosure, and various modifications can be made and implemented within the scope not departing from the gist of the present disclosure.

For example, in the above embodiment, the image forming apparatus 1 is described as what is called a tandem-type image forming apparatus for color printing, which sequentially forms images of a plurality of colors one on top of another, but the image forming apparatus 1 is not limited to an image forming apparatus of such a type. The image forming apparatus 1 may be a non-tandem type image forming apparatus for color printing or an image forming apparatus for monochrome printing.

What is claimed is:

1. A developing device, comprising:

a development container including
- a first conveyance chamber and a second conveyance chamber that are arranged parallel to each other,
- a first partition wall that separates the first conveyance chamber and the second conveyance chamber along a longitudinal direction of the first conveyance chamber and the second conveyance chamber,
- a communication portion that allows the first conveyance chamber and the second conveyance chamber to communicate with each other at opposite end-part sides of the first partition wall in a longitudinal direction thereof,
- a developer replenishment port through which a developer including a magnetic carrier and a toner is replenished, and
- a developer discharge port that is disposed at a downstream end part of the second conveyance chamber and through which an excess of the developer is discharged, the development container accommodating the developer;

a first conveyance member that includes a first rotation shaft and a first conveyance blade formed on an outer circumferential surface of the first rotation shaft, and that conveys, while stirring, the developer in the first conveyance chamber in a first direction;

a second conveyance member that includes a second rotation shaft and a second conveyance blade formed on an outer circumferential surface of the second rotation shaft, and that conveys, while stirring, the developer in the second conveyance chamber in a second direction that is opposite to the first direction; and a developer carrier that is rotatably supported in the development container so as to face an image carrier, and that supplies the toner inside the second conveyance chamber to the image carrier, wherein the second conveyance member includes
- a regulation blade that is formed downstream of the second conveyance blade with respect to the second direction, and that conveys the developer in a direction opposite to the second conveyance blade, and
- a discharge blade that is formed downstream of the regulation blade with respect to the second direction, and that conveys the developer in a same direction as the second conveyance blade to discharge the developer through the developer discharge port, the developer replenishment port is an opening formed in an upper surface of the development container, and at least part of an opening length thereof in the second direction is included in a regulation area which is an area inside the second conveyance chamber where the regulation blade is disposed, at least part of the developer replenished through the developer replenishment port falls into both the first conveyance chamber and the regulation area, the communication portion includes a first communication portion that delivers the developer, at a downstream side in the first direction, from the first conveyance chamber to the second conveyance chamber, and a second communication portion that delivers the developer, at a downstream side in the second direction, from the second conveyance chamber to the first conveyance chamber, the development container includes a second partition wall that is disposed downstream of the second communication portion with respect to the second direction so as to be adjacent to the regulation area, and that separates the first conveyance chamber and the regulation area, the developer replenishment port is disposed above the second partition wall, a falling area into which the developer replenished through the developer replenishment port falls is partitioned by the second partition wall into the first conveyance chamber and the regulation area, and the opening length of the developer replenishment port in the second direction is entirely located downstream of the second communication portion with respect to the second direction.

2. The developing device according to claim 1, wherein the opening length of the developer replenishment port in the second direction is entirely included in the regulation area which is the area inside the second conveyance chamber where the regulation blade is disposed.

3. The developing device according to claim 1, wherein the opening length of the developer replenishment port in the second direction is shorter than the second partition wall.

4. An image forming apparatus comprising the developing device according to claim 1.

5. A developing device, comprising:

a development container including a first conveyance chamber and a second conveyance chamber that are arranged parallel to each other, a first partition wall that separates the first conveyance chamber and the second conveyance chamber along a longitudinal direction of the first conveyance chamber and the second conveyance chamber, a communication portion that allows the first conveyance chamber and the second conveyance chamber to communicate with each other at opposite end-part sides of the first partition wall in a longitudinal direction thereof, and a developer replenishment port through which a developer including a magnetic carrier and a toner is replenished, the development container accommodating the developer;

a first conveyance member that includes a first rotation shaft and a first conveyance blade formed on an outer circumferential surface of the first rotation shaft, and that conveys, while stirring, the developer in the first conveyance chamber in a first direction;

a second conveyance member that includes a second rotation shaft and a second conveyance blade formed on an outer circumferential surface of the second rotation shaft, and that conveys, while stirring, the developer in the second conveyance chamber in a second direction that is opposite to the first direction; and a developer carrier that is rotatably supported in the development container so as to face an image carrier, and that supplies the toner inside the second conveyance chamber to the image carrier, wherein the second conveyance member includes a regulation blade that is formed downstream of the second conveyance blade with respect to the second direction, and that conveys the developer in a direction opposite to the second conveyance blade, the developer replenishment port is an opening formed in an upper surface of the development container, and at least part of an opening length thereof in the second direction is included in a regulation area which is an area inside the second conveyance chamber where the regulation blade is disposed, at least part of the developer replenished through the developer replenishment port falls into both the first conveyance chamber and the regulation area, the communication portion includes a first communication portion that delivers the developer, at a downstream side in the first direction, from the first conveyance chamber to the second conveyance chamber, and a second communication portion that delivers the developer, at a downstream side in the second direction, from the second conveyance chamber to the first conveyance chamber, the development container includes a second partition wall that is disposed downstream of the second communication portion with respect to the second direction so as to be adjacent to the regulation area, and that separates the first conveyance chamber and the regulation area, the developer replenishment port is disposed above the second partition wall, a falling area into which the developer replenished through the developer replenishment port falls is partitioned by the second partition wall into the first conveyance chamber and the regulation area, and the opening length of the developer replenishment port in the second direction is entirely located downstream of the second communication portion with respect to the second direction.

* * * * *